(12) United States Patent
Hekstra (10) Patent No.: US 6,543,025 B2
(45) Date of Patent: *Apr. 1, 2003

(54) TRANSMISSION SYSTEM WITH ADAPTIVE CHANNEL ENCODER AND DECODER

(75) Inventor: Ewa B. Hekstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/086,047

(22) Filed: Feb. 28, 2002

(65) Prior Publication Data

US 2002/0120904 A1 Aug. 29, 2002

Related U.S. Application Data

(63) Continuation of application No. 09/318,331, filed on May 25, 1999, now Pat. No. 6,363,513.

(30) Foreign Application Priority Data

May 26, 1998 (EP) .......................................... 98201735

(51) Int. Cl.$^7$ ........................................... H03M 13/00
(52) U.S. Cl. ..................................................... 714/774
(58) Field of Search ................................ 714/774, 786

(56) References Cited

U.S. PATENT DOCUMENTS

| | | | | |
|---|---|---|---|---|
| 5,729,557 A | * | 3/1998 | Gardner et al. ............. | 714/774 |
| 5,912,907 A | * | 6/1999 | Stewart ....................... | 714/774 |
| 6,044,485 A | * | 3/2000 | Dent et al. .................. | 714/774 |
| 6,108,374 A | * | 8/2000 | Balachandran et al. ..... | 375/227 |
| 6,363,513 B1 | * | 3/2002 | Hekstra ....................... | 714/786 |

OTHER PUBLICATIONS

By E. Yuen Et Al. Entitled: "Variable Rate Speech and Channel Coding for Mobile Communication" 1994 IEEE 44$^{th}$ Vehicular Technology Conference, Jun. 8–10, 1994, vol. 3, pp. 1709–1713.

By Matsuoka Et Al. Entitled: "Adaptive Modulation System with Variable Coding Rate Concatenated Code for High Quality Multi-Media Communications Systems" 1996 IEEE 46$^{th}$ Vehicular Technology Conference, 1996, vol. 1, pp 487–491.

* cited by examiner

Primary Examiner—Albert DeCady
Assistant Examiner—Joseph D. Torres
(74) Attorney, Agent, or Firm—Jack D. Slobod (57) ABSTRACT

In a transmission system comprising a transmitter coupled via a transmission channel to a receiver. The transmitter comprises a channel encoder for deriving encoded symbols from source symbols. The receiver comprises a channel decoder for reconstructing the source symbols from the signal received from the transmission channel. According to the present invention, the transmitter comprises a separate encoder for coding and transmitting a coding property used in the channel encoder to the receiver. The receiver is arranged for receiving the encoded coding property from the transmission medium, and the separate channel decoder is arranged for decoding the encoded coding property. The coding property provided by the separate channel decoder is passed to a code property setting component in the channel decoder for setting the coding property of the channel decoder.

3 Claims, 6 Drawing Sheets

TRANSMISSION SYSTEM WITH ADAPTIVE CHANNEL ENCODER AND DECODER

CROSS REFERENCE TO RELATED APPLICATIONS

This is a continuation of application Ser. No. 09/318,331, filed May 25, 1999 now U.S. Pat. No. 6,363,513.

BACKGROUND OF THE INVENTION

1. Field of the Invention

The present invention relates to a transmission system having a transmitter coupled via a transmission channel to a receiver. The transmitter includes a channel encoder for encoding source symbols into coded symbols according to a coding property, and the receiver includes a source decoder for deriving reconstructed source symbols from the coded symbols received from the transmission channel. The transmission system further has a quality determining component for deriving a transmission quality measure, and a coding property setting component for setting the coding property to a value dependent on the transmission quality measure.

2. Description of the Related Art

Transmission systems can be used in applications where the quality of the transmission channel shows considerable variations. To enable a virtual error free transmission over such a transmission channel, the transmitter encodes the source symbols using a channel encoder according to an error correcting code having error correcting capabilities. In the receiver, the source symbols are reconstructed by a channel decoder. Useful codes can include convolutional codes and several types of block codes such as Reed-Solomon codes. Also a combination of a convolutional code with a block code is often used.

The ratio between the number of source symbols and the number of channel symbols of such a code is called the rate of the code. The error correction capabilities of such a code depend heavily on the rate of the code. In case of a transmission channel with a strongly varying transmission quality, the rate of the used channel code should be chosen to obtain virtually error free transmission at the worst channel conditions. This leads to a loss of useful transmission capacity when the transmission quality is high.

To prevent this loss of transmission capacity, the transmission system can set the at least one coding property (e.g., the rate of the channel encoder) in dependence on the transmission quality. If a Viterbi decoder is used as channel decoder, the transmission quality measure can be derived from the likelihood measures used in the Viterbi decoder.

Other quality measures can be, for example, constituted by a number of detected transmission errors per unit of time.

The problem to be solved by the present invention is how to derive a reliable quality measure despite of rapidly changing channel properties and changing coding properties.

BRIEF SUMMARY OF THE INVENTION

To solve the problem with the prior art, a transmission system according to the present invention is characterized in that the transmission system comprises a filter for deriving a filtered transmission quality measure, and in that the transmission system comprises filter initializing means for setting the filter to a predetermined initial state at a changing coding property.

By using a filter to derive a filtered quality measure, an averaged quality measure is obtained which is suitable as basis for making decisions about the coding property. In order to reduce transient phenomena in the filter at the change of the coding property, the filter is set to a predetermined initial state. In one embodiment of the present invention, the filter is characterized in that the initial state corresponds to a typical quality measure for the changed coding property. By setting the initial state of the filter to a value corresponding to a typical quality measure, it is obtained that no transient phenomena occurs in the filter when the transmission quality corresponds to the typical value when the coding property is changed.

A further embodiment of the present invention is characterized in that a receiver comprises transmission means for transmitting the quality measure to the transmitter, in that a transmitter comprises a transmitter filter for obtaining a filtered quality measure, and in that a coding property setting means is arranged for setting the coding property in dependence on the filtered quality measure.

By transmitting the quality measure to the transmitter via a return link, the filter can be placed in the transmitter. It is observed that it is also possible that a filter is present in the receiver and the transmitter. The receiver is then arranged for transmitting via the return path a pre-filtered quality measure to the transmitter, which performs a further filter operation on the pre-filtered signal. The transmitter can be included in a base station for mobile communication, but it is also possible that the transmitter is included in the mobile station.

BRIEF DESCRIPTION OF THE DRAWINGS

The present invention will now be explained with reference to the following drawing figures.

DETAIL DESCRIPTION OF THE INVENTION

Figure 1:
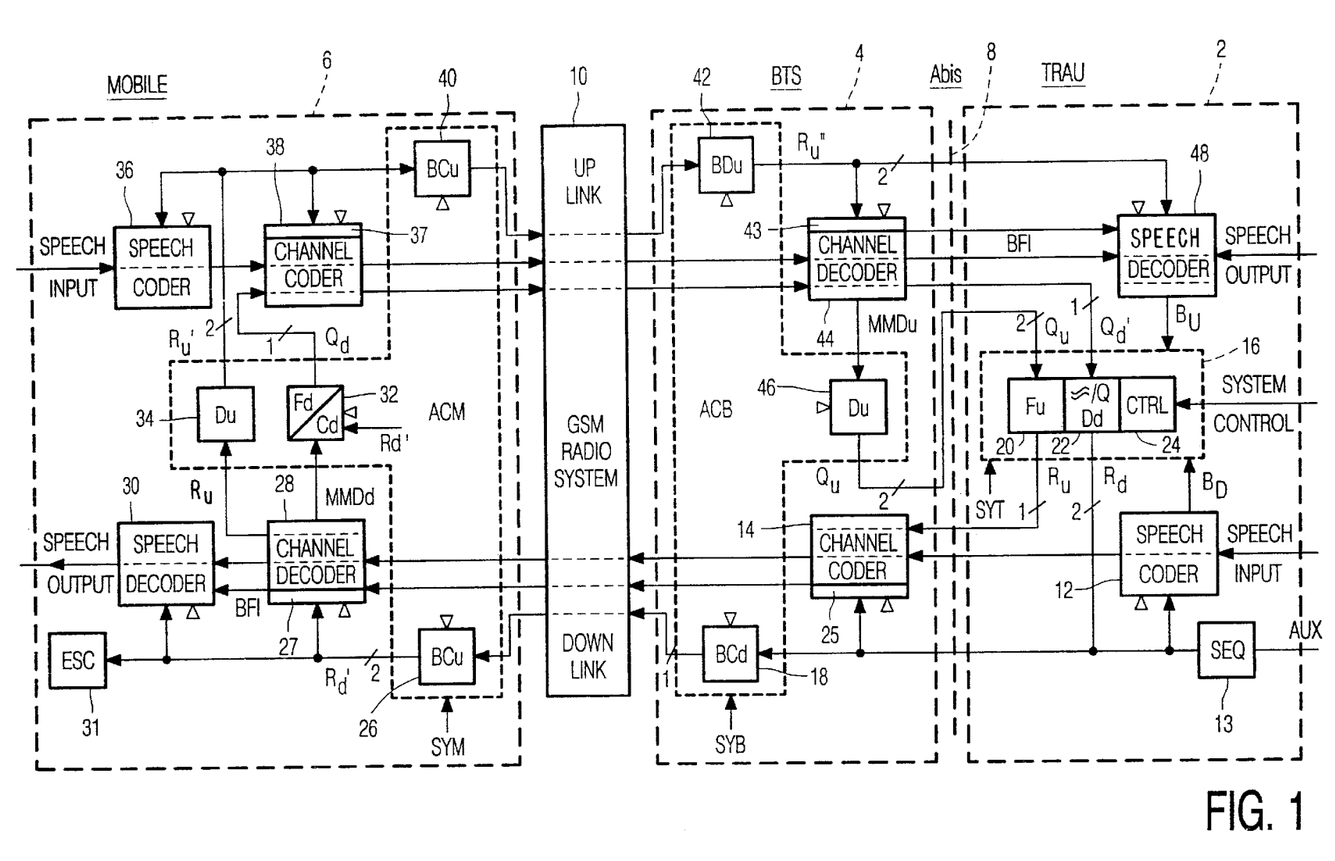
FIG. 1 shows a transmission system according to the present invention.

A transmission system according to FIG. 1 comprises three important elements being the TRAU (Transcoder and Rate Adapter Unit) 2, the BTS (Base Transceiver Station) 4 and the Mobile Station 6. The TRAU 2 is coupled to the BTS 4 via the A-bis interface 8. The BTS 4 is coupled to the Mobile Unit 6 via an Air Interface 10.

A main signal being here a speech signal to be transmitted to the Mobile Unit 6 is applied to a speech encoder 12. A first output of the speech encoder 12 carrying an encoded speech signal, also referred to as source symbols, is coupled to a channel encoder 14 via the A-bis interface 8. A second output of the speech encoder 12 carrying a background noise level indicator $B_D$ is coupled to an input of a system controller 16. A first output of the system controller 16 carrying a coding property, being here a downlink rate assignment signal $R_d$ is coupled to the speech encoder 12 and, via the A-bis interface 8, to coding property setting component 25 in the channel encoder 14 and to a further channel encoder being here a block coder 18. A second output of the system controller 16 carrying an uplink rate assignment signal $R_u$ is coupled to a second input of the channel encoder 14. The two-bit rate assignment signal $R_u$ is transmitted bit by bit over two subsequent frames. The rate assignment signals $R_d$ and $R_u$ constitute a request to operate the downlink and the uplink transmission system on a coding property represented by $R_d$ and $R_u$ respectively.

It is observed that the value of $R_d$ transmitted to the mobile station 6 can be overruled by a coding property sequencing component 13 which can force a predetermined sequence of coding properties, as represented by the rate assignment signal $R_u$, onto the block encoder 18, the channel encoder 14 and the speech encoder 12. This predetermined sequence can be used for conveying additional information to the mobile station 6 without needing additional space in the transmission frame. It is possible that more than one predetermined sequence of coding properties is used. Each of the predetermined sequences of coding properties corresponds to a different auxiliary signal value.

The system controller 16 receives from the A-bis interface 8 a pair of quality measures $Q_u$ and $Q_d'$ indicating the quality of the air interface 10 (radio channel) for the uplink and the downlink. The quality measure $Q_u$ is compared with a plurality of threshold levels, and the result of this comparison is used by the system controller 16 to divide the available channel capacity between a speech encoder 36 and a channel encoder 38 of the uplink. The signal $Q_d'$ is filtered by a processing unit 22 and is subsequently compared with a plurality of threshold values. The result of the comparison is used to divide the available channel capacity between the speech encoder 12 and the channel encoder 14. For the uplink and the downlink, four different combinations of the division of the channel capacity between the speech encoder 12 and the channel encoder 14 are possible. These possibilities are presented in the following Table I:

TABLE 1

| $R_x$ | $R_{SPEECH}$(kbit/s) | $R_{CHANNEL}$ | $R_{TOTAL}$(kbit/s) |
|---|---|---|---|
| 0 | 5.5 | 1/4 | 22.8 |
| 1 | 8.1 | 3/8 | 22.8 |
| 2 | 9.3 | 3/7 | 22.8 |
| 3 | 11.1 | 1/2 | 22.8 |
| 0 | 5.5 | 1/2 | 11.4 |
| 1 | 7.0 | 5/8 | 11.4 |
| 2 | 8.1 | 3/4 | 11.4 |
| 3 | 9.3 | 6/7 | 11.4 |

From Table 1, it can be seen that the bitrate allocated to the speech encoder 12 and the rate of the channel encoder 14 increases with the channel quality. This is possible because at better channel conditions the channel encoder 14 can provide the required transmission quality (Frame Error Rate) using a lower bitrate. The bitrate saved by the larger rate of the channel encoder 14 is exploited by allocating it to the speech encoder 12 in order to obtain a better speech quality. It is observed that the coding property is here the rate of the channel encoder 14. The coding property setting component 25 is arranged for setting the rate of the channel encoder 14 according to the coding property supplied by the system controller 16.

Under bad channel conditions, the channel encoder 14 needs to have a lower rate in order to be able to provide the required transmission quality. In one embodiment, the channel encoder 14 will be a variable rate convolutional encoder which encodes the output bits of the speech encoder 12 to which an 8-bit CRC is added. The variable rate can be obtained by using different convolutional codes having a different basic rate or by using puncturing of a convolutional code with a fixed basic rate. Preferably, a combination of these methods is used.

In the following Table 2 presented below, the properties of the convolutional codes given in Table 1 are presented. All these convolutional codes have a value v equal to 5.

TABLE 2

| Pol/Rate | 1/2 | 1/4 | 3/4 | 3/7 | 3/8 | 5/8 | 6/7 |
|---|---|---|---|---|---|---|---|
| $G_1 = 43$ | 0 | 0 | 0 | 0 | 0 | 0 | 000002 |
| $G_2 = 45$ | 0 | 0 | 0 | 003 | 0 | 00020 | 0 |
| $G_3 = 47$ | 0 | 0 | 001 | 0 | 301 | 01000 | 0 |
| $G_4 = 51$ | 0 | 4 | 0 | 0 | 0 | 00002 | 101000 |
| $G_5 = 53$ | 0 | 0 | 0 | 202 | 0 | 0 | 0 |
| $G_6 = 55$ | 0 | 3 | 0 | 0 | 0 | 0 | 0 |
| $G_7 = 57$ | 2 | 0 | 0 | 020 | 230 | 0 | 0 |
| $G_8 = 61$ | 0 | 0 | 002 | 0 | 0 | 0 | 0 |
| $G_9 = 65$ | 1 | 0 | 110 | 0 | 022 | 02000 | 000001 |
| $G_{10} = 66$ | 0 | 0 | 0 | 0 | 0 | 0 | 0 |
| $G_{11} = 67$ | 0 | 2 | 0 | 0 | 0 | 0 | 000010 |
| $G_{12} = 71$ | 0 | 0 | 0 | 001 | 0 | 0 | 0 |
| $G_{13} = 73$ | 0 | 0 | 0 | 0 | 010 | 0 | 0 |
| $G_{14} = 75$ | 0 | 0 | 0 | 110 | 100 | 10000 | 000100 |
| $G_{15} = 77$ | 0 | 1 | 0 | 0 | 0 | 00111 | 010000 |

In Table 2, the values $G_i$ represent the generator polynomials. The generator polynomials G(n) are defined according to the following equation [1]:

$$G_i(D) = g_0 \oplus g_1 \cdot D \oplus \ldots \oplus g_{n-1} \cdot D^{n-1} \oplus g_n \cdot D^n \qquad [(A)][1]$$

In equation [1], $\oplus$ is a modulo-2 addition and i is the octal representation of the sequence $g_0, g_1, \ldots g_{v-1}, g_v$.

For each of the different codes, the generator polynomials used in it are indicated by a number in the corresponding cell. The number in the corresponding cell indicates for which of the source symbols the corresponding generator polynomial is taken into account. Furthermore the number indicates the position of the coded symbol derived by using the polynomial in the sequence of source symbols. Each digit indicates the position in the sequence of channel symbols of the channel symbol derived by using the indicated generator polynomial. For the rate 1/2 code, the generator polynomials 57 and 65 are used. For each source symbol, first the channel symbol calculated according to polynomial 65 is transmitted, and secondly the channel symbol according to generator polynomial 57 is transmitted. In a similar way the polynomials to be used for determining the channel symbols for the rate 1/4 code can be determined from Table 2. The other codes are punctured convolutional codes. If a digit in the Table 2 is equal to 0, it means that the corresponding generator polynomial is not used for the particular source symbol. From Table 2, it can be seen that some of the generator polynomials are not used for each of the source symbols. It is observed that the sequences of numbers in the Table 2 are continued periodically for sequences of input symbols longer than 1, 3, 5 or 6 respectively.

It is observed.that Table 1 gives the values of the bitrate of the speech encoder 12 and the rate of the channel encoder 14 for a full rate channel and a half rate channel. The decision about which channel is used is taken by the system operator, and is signaled to the TRAU 2, the BTS 4 and the Mobile Station 6, by means of an out of band control signal, which can be transmitted on a separate control channel of system controller 16. To the channel encoder 14 also the signal $R_u$ is applied.

The block coder 18 is present to encode the selected rate $[R_D]$ $R_d$ for transmission to the Mobile Station 6. This rate $R_d$ is encoded in a separate encoder for two reasons. The first reason is that it is desirable to inform the channel decoder 28 in the Mobile Station 6 of a new rate $R_d$ before data encoded according to the rate arrives at the channel decoder 28. A second reason is that it is desired that the value $R_d$ is better protected against transmission errors than it is possible with the channel encoder 14. To enhance the error correcting properties of the encoded $R_d$ value even more, the codewords are split in two parts which are transmitted in separate frames. This splitting of the codewords allows longer codewords to be chosen, resulting in further improved error correcting capabilities.

The block coder 18 encodes the coding property $R_d$ which is represented by two bits into an encoded coding property encoded according to a block code with codewords of 16 bits if a full rate channel is used. If a half rate channel is used, a block code with codewords of 8 bits are used to encode the coding property. The codewords used are presented below in the following Table 3 and Table 4:

TABLE 3

Half Rate Channel

| $R_D[1]$ | $R_D[2]$ | $C_0$ | $C_1$ | $C_2$ | $C_3$ | $C_4$ | $C_5$ | $C_6$ | $C_7$ |
|---|---|---|---|---|---|---|---|---|---|
| 0 | 0 | 0 | 0 | 0 | 0 | 0 | 0 | 0 | 0 |
| 0 | 1 | 0 | 0 | 1 | 1 | 1 | 1 | 0 | 1 |
| 1 | 0 | 1 | 1 | 0 | 1 | 0 | 0 | 1 | 1 |
| 1 | 1 | 1 | 1 | 1 | 0 | 1 | 1 | 1 | 0 |

TABLE 4

Full Rate Channel

| $R_D[1]$ | $R_D[2]$ | $C_0$ | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 1 | 1 | 1 | 1 | 0 | 1 | 0 | 0 | 1 | 1 | 1 | 1 | 0 | 1 |
| 1 | 0 | 1 | 1 | 0 | 1 | 0 | 0 | 1 | 1 | 1 | 1 | 0 | 1 | 0 | 0 | 1 | 1 |
| 1 | 1 | 1 | 1 | 1 | 0 | 1 | 1 | 1 | 0 | 1 | 1 | 1 | 0 | 1 | 1 | 1 | 0 |

From Table 3 and Table 4, it can be seen that the codewords used for a full rate channel are obtained by repeating the codewords used for a half rate channel, resulting in improved error correcting properties. In a half-rate channel, the symbols $C_0$ to $C_3$ are transmitted in a first frame, and the bits $C_4$ to $C_7$ are transmitted in a subsequent frame. In a full-rate channel, the symbols $C_0$ to $C_7$ are transmitted in a first frame, and the bits $C_8$ to $C_{15}$ are transmitted in a subsequent frame.

The outputs of the channel encoder 14 and the block coder 18 are transmitted in time division multiplex over the air interface 10. It is however also possible to use CDMA for transmitting the several signals over the air interface 10. In the Mobile Station 6, the signal received from the air interface 10 is applied to a channel decoder 28 and to a further channel decoder being here a block decoder 26. The block decoder 26 is arranged for deriving the coding property represented by the $[R_D]$ $R_d$ bits by decoding the encoded coding property represented by codeword $C_0 \ldots C_N$, in which N is 7 for the half rate channel and N is 15 for the full rate channel.

The block decoder 26 is arranged for calculating the correlation between the four possible codewords and its input signal. This is done in two passes because the codewords are transmitted in parts in two subsequent frames. After the input signal corresponding to the first part of the codeword has been received, the correlation value between the first parts of the possible codewords and the input value are calculated and stored. When in the subsequent frame the input signal corresponding to the second part of the codeword is received, the correlation value between the second parts of the possible codewords and the input signal are calculated and added to the previously stored correlation value in order to obtain the final correlation values. The value of $R_d$ corresponding to the codeword having the largest correlation value with the total input signal is selected as the received codeword representing the coding property, and is passed to the output of the block decoder 26. The output of the block decoder 26 is connected to a control input of a property setting component 27 in the channel decoder 28 and to a control input of the speech decoder 30 for setting the rate of the channel decoder 28 and the bitrate of the speech decoder 30 to a value corresponding to the signal $R_d$.

The channel decoder 28 decodes its input signal, and presents at a first output an encoded speech signal to an input of the speech decoder 30.

The channel decoder 28 presents at a second output a signal BFI (Bad Frame Indicator) indicating an incorrect reception of a frame. This BFI signal is obtained by calculating a checksum over a part of the signal decoded by a convolutional decoder in the channel decoder 28, and by comparing the calculated checksum with the value of the checksum received from the air interface 10.

The speech decoder 30 is arranged for deriving a replica of the speech signal of the speech encoder 12 from the output signal of the channel decoder 20. In case a BFI signal is received from the channel decoder 28, the speech decoder 30 is arranged for deriving a speech signal based on the previously received parameters corresponding to the previous frame. If a plurality of subsequent frames are indicated as bad frame, the speech decoder 30 can be arranged for muting its output signal.

The channel decoder 28 provides at a third output the decoded signal $R_u$ to a deformratter 34. The signal $R_u$ represents a coding property being here a bitrate setting of the uplink. Per frame, the signal $R_u$ comprises 1 bit (the RQI bit). In the deformatter 34, the two bits received in subsequent frames are combined in a bitrate setting $R_u$, for the uplink which is represented by two bits. This bitrate setting $R_u'$ which selects one of the possibilities according to Table 1 to be used for the uplink is applied to a control input of a speech encoder 36, to a control input of a code property setting component 37 of a channel encoder 38, and to an input of a further channel encoder being here a block encoder 40. If the channel decoder 28 signals a bad frame by issuing a BFI signal, the decoded signal $R_u$ is not used for setting the uplink rate, because it is regarded as unreliable.

The channel decoder 28 provides at a fourth output a quality measure MMDd. This measure MMDd can easily be derived when a Viterbi decoder is used in the channel decoder 28. This quality measure is filtered in a processing unit 32 according to a first order filter. The output signal of the filter in the processing unit 32 can be written in accordance with the following equation [2]:

$$MMD'[n]=(1-\alpha)\cdot MMD[n]+\alpha\cdot MMD'[n-1] \qquad [(B)][2]$$

After the bitrate setting of the channel decoder 28 has been changed in response to a changed value of $R_d$, the value of a MMD'[n−1] is set to a typical value corresponding to the long time average of the filtered MMDd for the newly set bitrate and for a typical downlink channel quality. This is done to reduce transient phenomena when switching between different values of the bitrate.

The output signal of the filter is quantized with 2 bits to a quality indicator $Q_d$. The quality indicator $Q_d$ is applied to a second input of the channel encoder 38. The 2 bit quality indicator $Q_d$ is transmitted once each two frames using one bit position in each frame.

A speech signal applied to the speech encoder 36 in the mobile station 6 is encoded and passed to the channel encoder 38. The channel encoder 38 calculates a CRC value over its input bits, adds the CRC value to its input bits, and encodes the combination of input bits and CRC value according to the convolutional code selected by the signal $R_{u'}$ from Table 1.

The block encoder 40 encodes the signal $R_{u'}$ represented by two bits according to Table 3 or Table 4 dependent on whether a half-rate channel or a full-rate channel is used. Also here only half a codeword is transmitted in a frame.

The output signals of the channel encoder 38 and the block encoder 40 in the Mobile Station 6 are transmitted via the air interface 10 to the BTS 4. In the BTS 4, the block coded signal $R_{u'}$ is decoded by a further channel decoder being here a block decoder 42. The operation of the block decoder 42 is the same as the operation of the block decoder 26. At the output of the block decoder 42 a decoded coding property represented by a signal $R_{u''}$ is available. This decoded signal $R_{u''}$ is applied to a control input of a coding property setting component 43 in a channel decoder 44 and is passed, via the A-bis interface 8 to a control input of a speech decoder 48.

In the BTS 4, the signals from the channel encoder 38, received via the air interface 10, are applied to the channel decoder 44. The channel decoder 44 decodes its input signals, and passes the decoded signals via the A-bis interface 8 to the TRAU 2. The channel decoder 44 provides a quality measure MMDu representing the transmission quality of the uplink to a processing unit 46. The processing unit 46 performs a filter operation similar to that performed in the processing unit 32. Subsequently the result of the filter operation is quantized in two bits and transmitted via the A-bis interface 8 to the TRAU 2.

In the system controller 16, a decision unit 20 determines the bitrate setting $R_u$ to be used for the uplink from the quality measure $Q_u$. Under normal circumstances, the part of the channel capacity allocated to the speech coder 12 will increase with increasing channel quality. The rate $R_u$ is transmitted once per two frames.

The signal $Q_{d'}$ received from the channel decoder 44 is passed to a processing unit 22 in the system controller 16. In the processing unit 22, the bits representing $Q_{d'}$ received in two subsequent frames are assembled, and the signal $Q_{d'}$ is filtered by a first order low-pass filter, having similar properties as the low pass filter in the processing unit 32.

The filtered signal $Q_{d'}$ is compared with two threshold values which depend on the actual value of the downlink rate $R_d$. If the filtered signal $Q_{d'}$ falls below the lowest of the threshold values, the signal quality is too low for the rate $R_d$, and the processing unit 22 switches to a rate which is one step lower than the present rate. If the filtered signal $Q_{d'}$ exceeds the highest of the threshold values, the signal quality is too high for the rate $R_d$, and the processing unit 22 switches to a rate which is one step higher than the present rate. The decision taking about the uplink rate $R_u$ is similar as the decision taking about the downlink rate $R_d$.

Again, under normal circumstances, the part of the channel capacity allocated to the speech coder 12 will increase with increasing channel quality. Under special circumstances the signal $R_d$ can also be used to transmit a reconfiguration signal to the Mobile Station 6. This reconfiguration signal can indicate that a different speech encoding/decoding and or channel coding/decoding algorithm should be used. This reconfiguration signal can be encoded using a special predetermined sequence of $R_d$ signals. This special predetermined sequence of $R_d$ signals is recognized by an escape sequence decoder 31 in the Mobile Station 6, which is arranged for issuing a reconfiguration signal to the effected devices when a predetermined (escape) sequence has been detected. The escape sequence decoder 31 can comprise a shift register in which subsequent values of $R_d$ are clocked. By comparing the content of the shift register with the predetermined sequences, it can easily be detected when an escape sequence is received, and which of the possible escape sequences is received.

An output signal of the channel decoder 44, representing the encoded speech signal, is transmitted via the A-Bis interface 8 to the TRAU 2. In the TRAU 2, the encoded speech signal is applied to the speech decoder 48. A signal BFI at the output of the channel decoder 44, indicating the detecting of a CRC error, is passed to the speech decoder 48 via the A-Bis interface 8. The speech decoder 48 is arranged for deriving a replica of the speech signal of the speech encoder 36 from the output signal of the channel decoder 44. In case a BFI signal is received from the channel decoder 44, the speech decoder 48 is arranged for deriving a speech signal based on the previously received signal corresponding to the previous frame, in the same way as is done by the speech decoder 30. If a plurality of subsequent frames are indicated as bad frame, the speech decoder 48 can be arranged for performing more advanced error concealment procedures.

Figure 2:
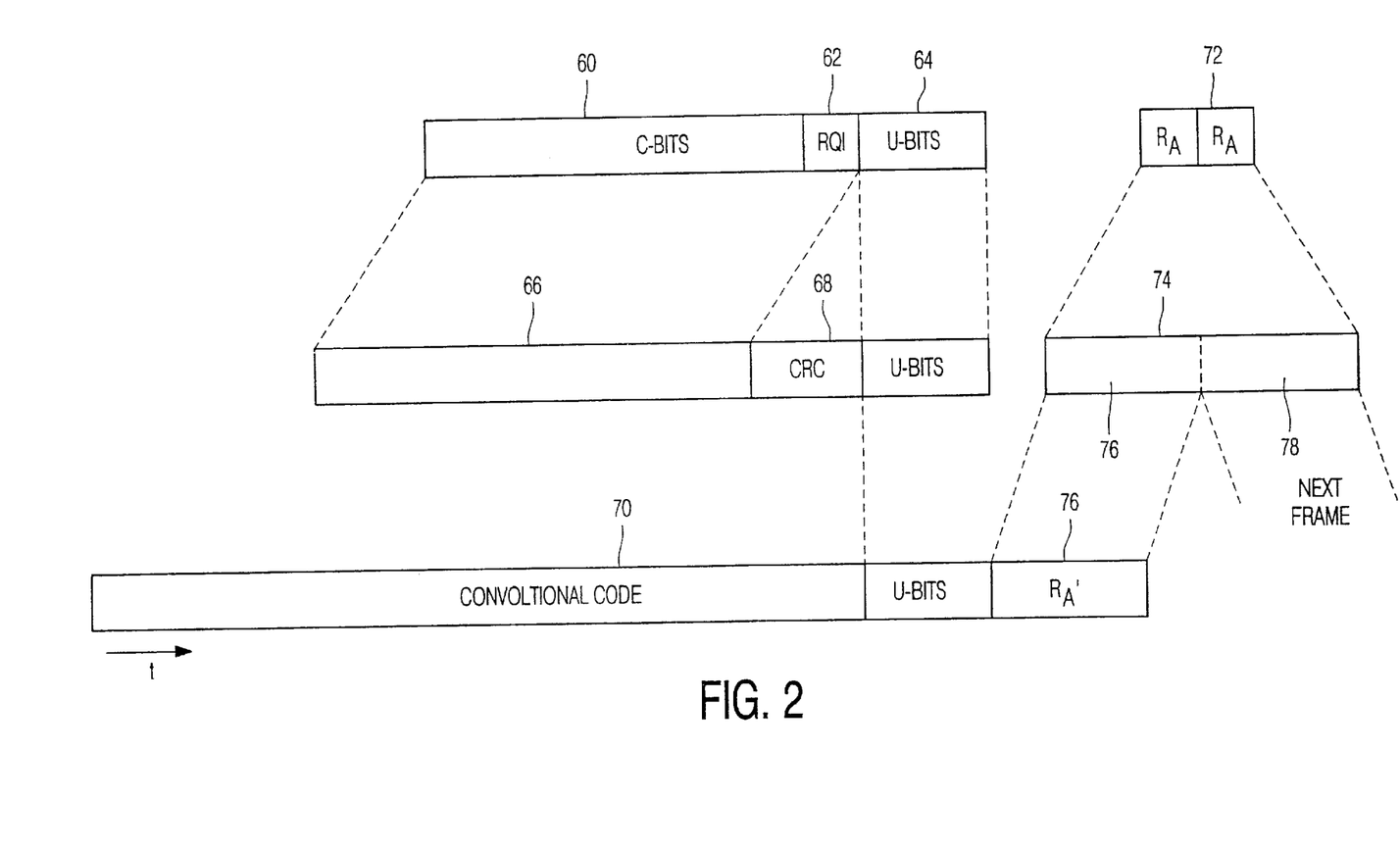
FIG. 2 shows a frame structure according to the present invention employed in the transmission system according to FIG. 1.

FIG. 2 shows the frame format used in a transmission system according to the present invention. The speech encoder 12 or 36 provides a group 60 of C-bits which should be protected against transmission errors, and a group 64 of U-bits which do not have to be protected against transmission errors. The further sequence comprises the U-bits 64. The decision unit 20 and the processing unit 32 provide one bit RQI 62 per frame for signaling purposes as explained above.

The above combination of bits is applied to the channel encoder 14 or 38 which first calculates a CRC over the combination of the RQI bit 62 and the group 60 of C-bits, and appends 8 CRC bits 68 behind the C-bits 60 and the RQI bit 62. The U-bits 64 are not involved with the calculation of the CRC bits 68. The combination 66 of the C-bits 60 and the RQI bit 62, and the CRC bits 68 are encoded according to a convolutional code into a coded sequence 70. The encoded symbols comprise the coded sequence 70. The U-bits 64 remains unchanged.

The number of bits in the combination 66 depends on the rate of the convolutional encoder 14 or 38, and the type of channel used, as is presented below in the following Table 5:

TABLE 5

| #bits/rate | ½ | ¼ | ¾ | 3/7 | ⅜ | ⅝ | 6/7 |
|---|---|---|---|---|---|---|---|
| Full rate | 217 | 109 | | | 189 | 165 | |
| Half rate | 105 | | 159 | | | 125 | 174 |

The two $R_A$ bits 72 which represent the coding property are encoded in codewords 74, which represent the encoded coding property, according the code displayed in Table 3 or 4, dependent on the available transmission capacity (half rate or full rate). This encoding is only performed once in two frames. The codewords 74 are split in two parts 76 and 78 and transmitted in the present frame and the subsequent frame.

Figure 3:
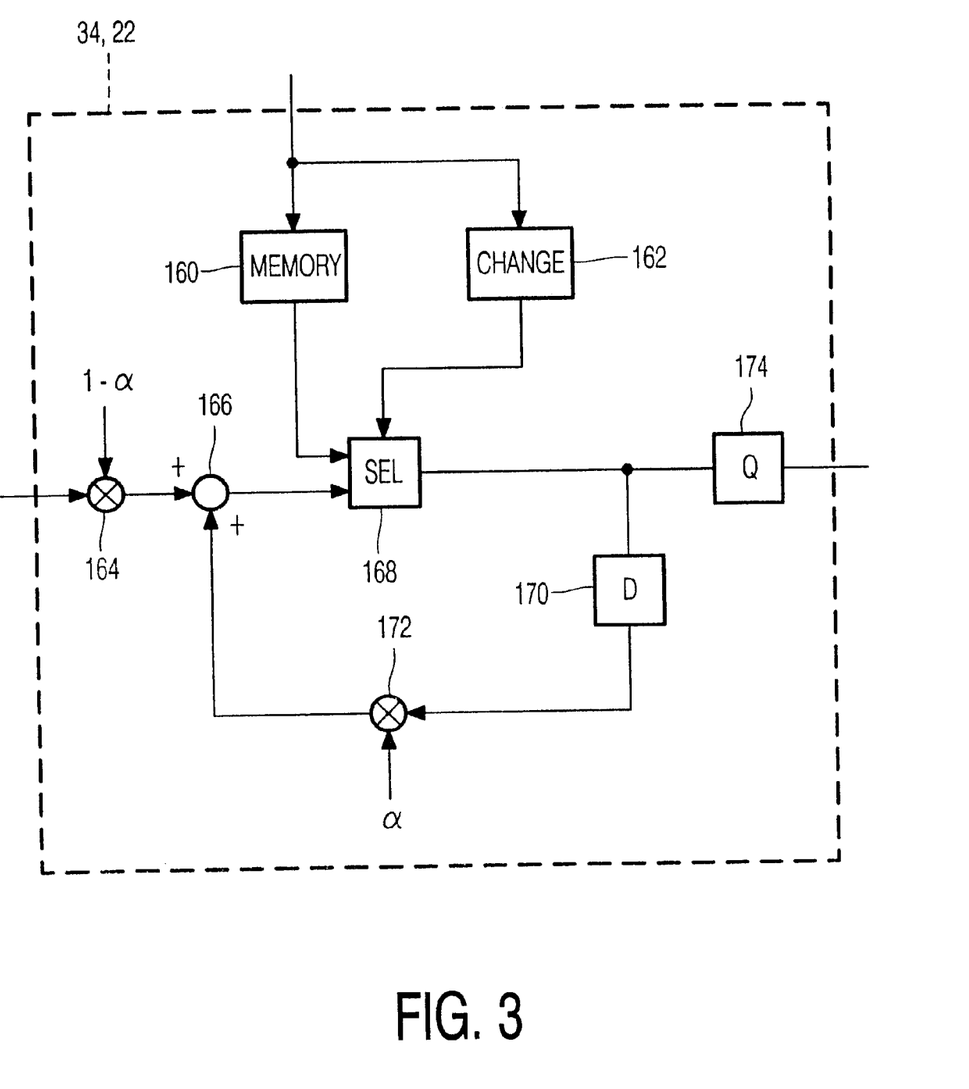
FIG. 3 shows a filter according to the present invention for filtering the quality measure.

In the filters 22 and 34 according to FIG. 3, the input signal is applied to a multiplier 164 which multiplies the input signal with a constant $(1-\alpha)$ defining the time constant of the filters 22 and 34. The output of the multiplier 164 is connected to a first input of an adder 166. An output of the adder 166 is connected to a first input of a selector 168, which passes under normal operation the output signal of the adder 166 to an input of a quantizer 174 and to an input of a delay element 170. The output of the delay element 170 is connected to an input of a multiplier 172 which multiplies the output signal of the delay element 170 with a factor $\alpha$. The output of the multiplier 172 is connected to a second input of the adder 166.

The combination of the multiplier 164, the adder 166, the delay element 170 and the multiplier 172 constitutes a low pass filter with a DC transfer function of 1 and a time constant which is proportional to $\alpha D$, in which D is the delay value of the delay element 170.

According to the present invention, the filters 22 and 34 can be set to a predetermined state in response to a changing coding property. For that purpose, the filters 22 and 34 include a filter initialization component having a change detector 162, a memory 160 and the selector 168. The change detector 162 detects a changing coding property by comparing the $R_x$ value of the present frame with the $R_x$ value of the previous frame. If the values differ, the selector 168 is activated in order to pass an initial state corresponding to the new value of $R_x$ from a memory 160 to the delay element 170, which takes over this value. The value read from the memory 160 depends on the new and the previous $R_x$ value, and is equal to one of the threshold values used in the processing unit 22. If the previous $R_x$ value indicated a lower transmission quality, the value read from the memory 160 is equal to the lower threshold value used in the processing unit 22. If the previous $R_x$ value indicated a higher transmission quality, the value read from the memory 160 is equal to the higher threshold value used in the processing unit 22. This is done to enable a quick switching back to the original situation when this is required.

In the following Table 6, the relation between the previous value of $R_x$, the present value of $R_x$ and the initial states of the filters 22 and 34 are shown:

TABLE 6

| Previous $R_x$ | Present $R_x$ | Initial filter state |
|---|---|---|
| 1 | 0 | $Threshold_0$ |
| 0 | 1 | $Threshold_1(low)$ |
| 2 | 1 | $Threshold_1(high)$ |
| 1 | 2 | $Threshold_2(low)$ |
| 3 | 2 | $Threshold_2(high)$ |
| 2 | 3 | $Threshold_3$ |

It is observed that for present values $R_x$ is 0 and 3 only one threshold value is used, because from that state switching in only one direction is possible.

Figure 4:
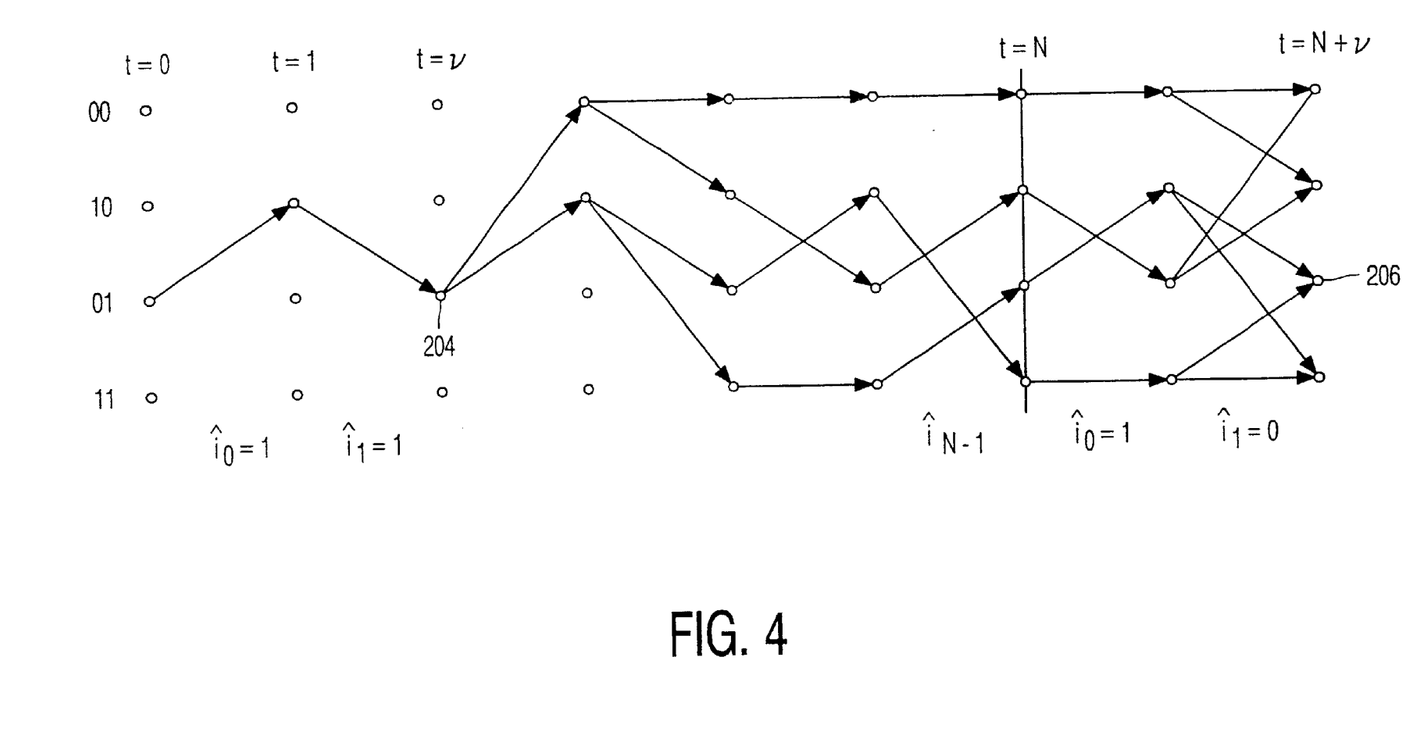
FIG. 4 shows a first trellis diagram used in a Viterbi decoder which provides the quality measure used in the present invention.

FIG. 4 shows an example of a trellis to be used in one embodiment of channel decoders 28 and 43 for determining the sequences of source symbols from the sequences of channel symbols. It is assumed that the source symbols are encoded wherein channel encoders 14 and 38 are convolutional channel encoders.

In a convolutional channel encoder, the sequence of source symbols are clocked into a shift register with length v. The state of the convolutional channel encoder is defined by the content of the shift register. If a binary convolutional channel encoder is used, the number of possible states of the convolutional encoder is equal to $2^v$. The channel symbols are obtained by combining several symbols available at different taps of the shift register by using modulo-two operations.

The channel decoders 28 and 43 are arranged for estimating the state sequences as they are present during the encoding process in the decoders 28 and 43. This estimating is done by determining candidate state sequences on basis of a likelihood measure, further to be referred to as path metric. This path metric is determined from the channel signal and [said] the candidate state sequences. The number of candidate sequences is equal to the number of states in the channel encoders 14 and 38.

At the beginning of the decoding process, each of the candidate sequences consists of one of the $2^v$ different states. The likelihood measures of all the states is set to equal values. After having received the channel signal corresponding to the initial state of the channel encoders 14 and 38, the candidate sequences are extended by constructing extended candidate sequences. Each extended candidate sequence comprises the originating candidate sequence to which one of the possible new states are appended. For each new state, the path metric for all the paths leading to [said] the new state is calculated from the path metric of the originating state and a branch metric determined from the channel signal and the channel symbols corresponding to the transition between the originating state and the new state.

The decoding step is terminated by keeping only the path and the corresponding path metric of the best path leading to the new state.

In the channel decoders 28 and 43 described by the trellis according to FIG. 4, the decoding is continued until the trellis has been extended N times, in which N is the number of source symbols. At that time, the state having the largest path metric is used as starting point for a trace back operation to find a earlier state, which is here the state 204 at the $v^{th}$ extension of the state sequence (t=v). From the trellis according to FIG. 4 it can be seen that the paths for $t \leq v$ are merged. The state 204 is stored for later use. After the state at t=N the decoding is continued until t=N+v. At t=N+v, the state 206 is selected as the state corresponding to the earlier state 204 which was stored at t=N. At state 206 the best path is selected, and this path is traced back to state 204 for determining the source symbols at each transition. It is observed that the source bit are not found in the correct order, but that they are circularly shifted over ν symbols. By shifting them back over ν symbols, the correct order can be restored.

It is preferable to delay the traceback to find the earlier state 204 until the state sequence has been extended to t=N+ν. At t=N+ν, the state having the largest path metric is selected and is used as starting point for the trace back operation to find the earlier state 204 at t=ν. Subsequently the state 206 is selected as the final state, which is used for determining the sequence of source symbols.

Figure 5:
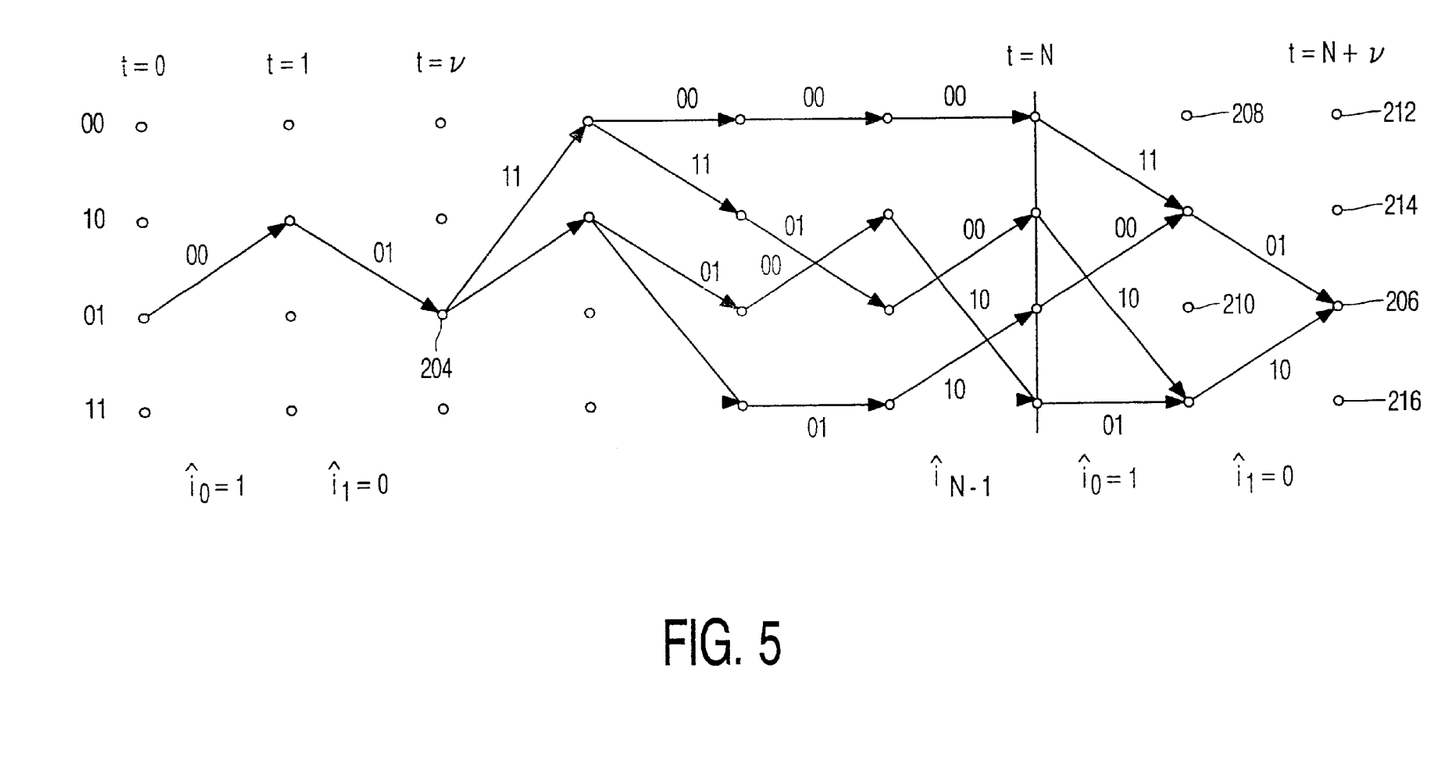
FIG. 5 shows a second trellis diagram used in a Viterbi decoder which provides the quality measure used in the present invention.

In FIG. 5, a trellis of a [slightly modified decoder] second embodiment of channel decoders 28 and 43 is shown. This trellis differs only for t>N from the trellis according to FIG. 4. After the selection of the most likely state at t=N and the subsequent traceback to find the earlier state 204, the channel decoders 28 and 43 force the trellis to end in state 206. A state 208 and a state 210 are not included anymore, because they cannot lead to state 206. For the same reason, the path metrics of a state 212, a state 214 and a state 216 are not determined.

Figure 6:
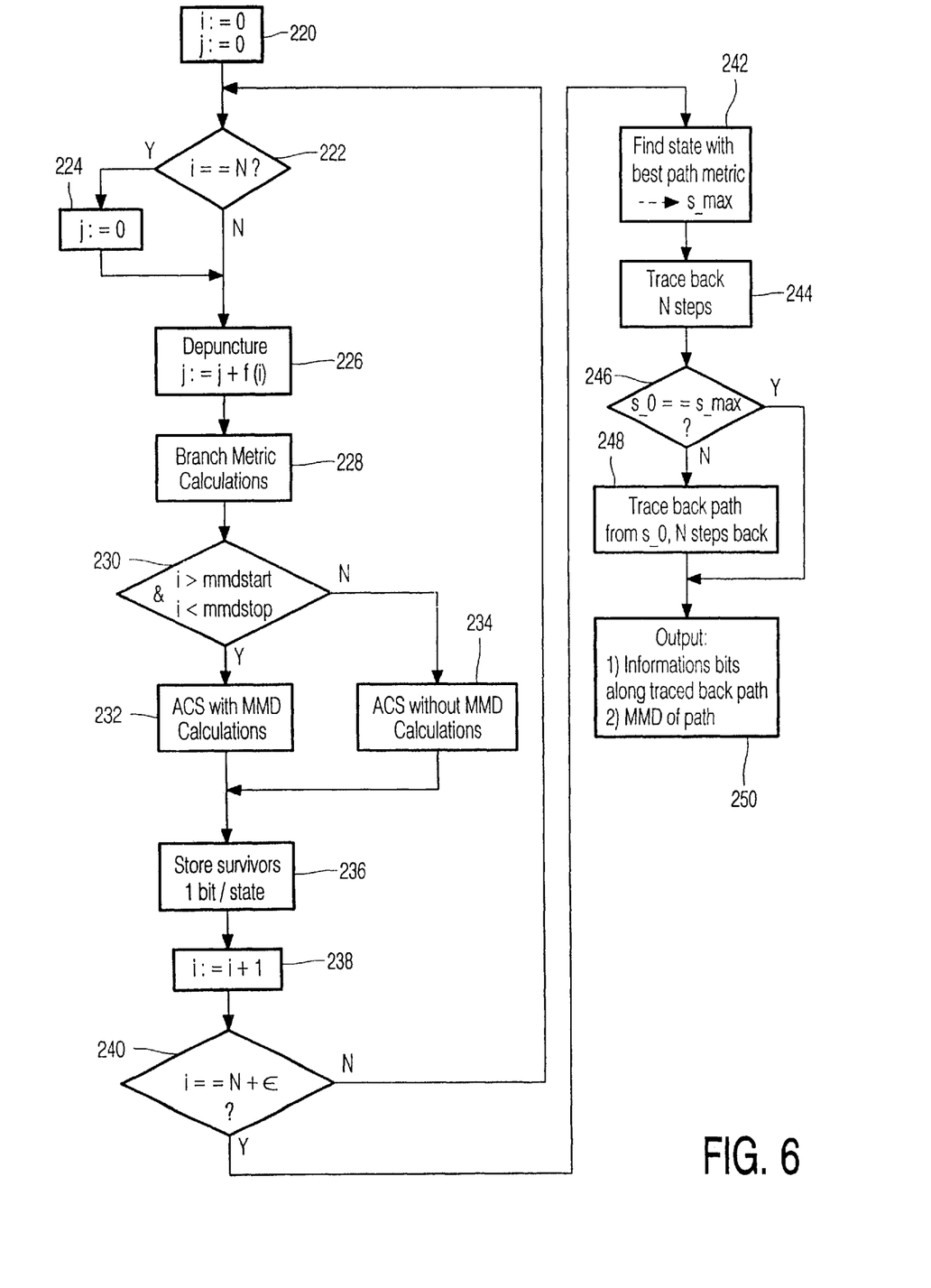
FIG. 6 shows a flow diagram of a program for a programmable processor according to the present invention to implement the Viterbi decoder.

In a flow diagram according to FIG. 6, a plurality of numbered blocks 220–250 have the following meaning in accordance with Table 7:

TABLE 7

| No | Inscription | Meaning |
|----|-------------|---------|
| 220 | i:=0<br>j:=0 | The source symbol pointer and the channel symbol index are initialized. |
| 222 | i==N? | The value of i is compared with N. |
| 224 | j:=0 | The channel symbol index is reset to 0. |
| 226 | Depuncture<br>j:=j+f(i) | A depuncturing operation is performed and the channel symbol index is updated accordingly. |
| 228 | Branch Metric Calculations | The new branch metrics are calculated |
| 230 | i>mmdstart & i<mmdstop | It is checked whether the source symbol pointer is in a predetermined range. |
| 232 | ACS with MMD calculations | The Add Compare Select operation, including the determination of the minimum metric distance is performed. |
| 234 | ACS without MMD calculations | The ACS operation is performed. |
| 236 | Store survivors | The survivors resulting from the ACS operation are stored. |
| 238 | i:=i+1 | The source symbol pointer is incremented. |
| 240 | i==N+ε? | The source symbol pointer is compared with N + ε. |
| 242 | Find best state | The best state is selected. |
| 244 | Trace back N steps from s_max to s_0 | A trace back operation for finding the earlier state is performed. |
| 246 | s_0 = s_max? | The selected state and the earlier state are compared. |
| 248 | Trace back N steps from s_max with s_max set to s_0 | The state s_max is made equal to state s_0 and a trace back operation to the earlier state is performed. |
| 250 | Output source symbols and MMD | The source symbols and the corresponding MMD are made available at the output. |

In the program according to the flow diagram of FIG. 6, it is assumed that the channel signal is sampled with the channel symbol period, and that the channel symbol samples are stored for later use. It is further observed that it is possible that a punctured convolution code is used. In a punctured convolutional coder, channel symbols at predetermined positions are simply deleted. In the corresponding decoder, the channel signal value is set to zero.

In instruction 220, the source symbol pointer i and the channel symbol index j are set to a value of 0. In instruction 222, the source symbol pointer i is compared with N. If i is equal to N, state sequences of length N have been determined, and all channel signal samples have been used once. In order to extend the encoding process, the first samples of the channel signal have to be re-used. This is obtained by resetting the channel symbol index to 0in instruction 224. In instruction 226, the channel signal samples to be used with the next to be performed branch metric calculations are determined. If a punctured convolutional code is used, the channel signal samples corresponding to non-transmitted channel symbols are set to a value of zero.

In instruction 228, the branch metrics are calculated. For each possible combination of new state and previous state, the corresponding channel symbols are read from a table. The branch metric corresponding to said combination of new state and previous state is determined by calculating a correlation value between the channel signal samples and the channel symbols read from the table. It is observed that for the calculation of the correlation value a symbol value of 0is represented by −1 and that a symbol value of 1 is represented by +1, because the ideal values of the channel signal samples are +a and −a. Channel signal samples corresponding to depunctured symbols are set to 0, indicating an erasure.

In instruction 230, it is checked whether the source symbol pointer lies in a range between mmdstart and mmdstop. The values mmdstart and mmdstop define a range within the trellis (FIG. 4 or FIG. 5) in which the quality measure is determined. If i falls outside the range, the program continues at instruction 234 for performing the Add Compare Select operation.

For each new state, the path metric of all paths ending in the new state is calculated. This is done by adding the branch metric calculated in instruction 234 to the state metric of the corresponding previous state. Subsequently the path metrics of the different paths ending in the new state are compared, and the path having the largest path metric is selected. The other paths are discarded. In the case of binary convolutional codes derived from a 1/n basic code, only two paths end in each new state. This add compare select operation is performed for each new state.

In instruction 232, the same operation as in instruction 234 is performed, but now also the MMD value is calculated. A metric difference (MD) is the difference between the two path metrics of the competing paths ending in a new state. The MMD value of a path is the minimum value of the metric difference (MD) encountered on [the path. The MMD value of the path finally selected is a good measure for the transmission quality. The implementation effort for determining the MMD is quite modest. Only a memory for keeping track of the MMD for each state has to be added. The calculations to be performed are also needed for the add compare select operation. The use of the MMD as measure for the transmission quality is generally applicable. Its use is not restricted to the "tail biting" or "zero tailing" codes discussed herein.

In instruction 236, the surviving state sequences are stored. This is done by storing for each state one symbol (one bit in the case of two possible paths ending in a state) for each state transition. This symbol uniquely defines the state transition. The value of the symbol may be taken equal to the source symbol corresponding to said transition.

In instruction 238, the source symbol pointer is incremented to prepare processing of the next stage of the trellis (FIG. 4 or FIG. 5).

In instruction 240, the value of the source symbol pointer i is compared with a value N+ε. The value of ε is chosen as compromise between the decoding complexity and the decoding quality. Experiments have shown that a suitable value for $\epsilon$ is $v$. For reduction of complexity, it can be advantageous to make $\epsilon$ equal to a multiple of the puncturing period of the convolutional code. In a simulated system, a value of $\epsilon$ between $2v$ and $2v+2$ is used.

If the value of i is smaller than $N+\epsilon$, the program is continued at instruction 222 for processing the next stage of the trellis (FIG. 4 or FIG. 5). Otherwise the program is continued at instruction 242. In instruction 242, the state having the largest path metric is selected as the best final state.

In instruction 244, a trace back operation is performed to find the earlier state. This is done by recursively reconstructing the states passed by the selected path until the earlier state is reached. For this use is made of the (source) symbols stored with the selected path. These symbols stored along the path are stored separately.

In instruction 246, the best final state selected in instruction 242 is compared with the earlier state found in instruction 144. If both states are the same, the program continues at instruction 250. If both states differ, in instruction 248 the state found as the earlier state is selected as final state, and a trace back until the earlier state is performed to determine all the source symbols.

In instruction 250, the reconstructed source sequence is passed to the output of the source encoder together with the MMD value associated with the finally selected final state.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A transmitter comprising:

encoding means for encoding source symbols into coded symbols according to a coding property;

deriving means for deriving a transmission quality measure;

first setting means for setting the coding property to a value dependent on the transmission quality measure;

operating means for operating a filter to derive a filtered transmission quality measure from the transmission quality measure; and second setting means for setting the filter to one of a plurality of predetermined initial states in response to each change in a setting of the coding property.

2. A receiver comprising:

encoding means for encoding source symbols into coded symbols according to a coding property which is set to a value dependent on a transmission quality measure;

receiving means for receiving a quality measure;

operating means for operating a filter to derive a filtered transmission quality measure from the received quality measure; and setting means for setting the filter to one of a plurality of predetermined initial states in response to each change in a setting of the coding property.

3. A transmission system comprising:

first deriving means for deriving reconstructed source symbols from symbols encoded according to a coding property which is set to a value dependent on a transmission quality measure;

second deriving means for deriving the transmission quality measure;

operating means for operating a filter to derive a filtered transmission quality measure from the transmission quality measure; and setting means for setting the filter to one of a plurality of predetermined initial states in response to each change in a setting of the coding property.

* * * * *